April 26, 1932.   C. A. CHRSTOS, JR   1,855,624
COMBINED MANUALLY AND AUTOMATICALLY OPERATED CLUTCH
Filed Nov. 12, 1928    4 Sheets-Sheet 1
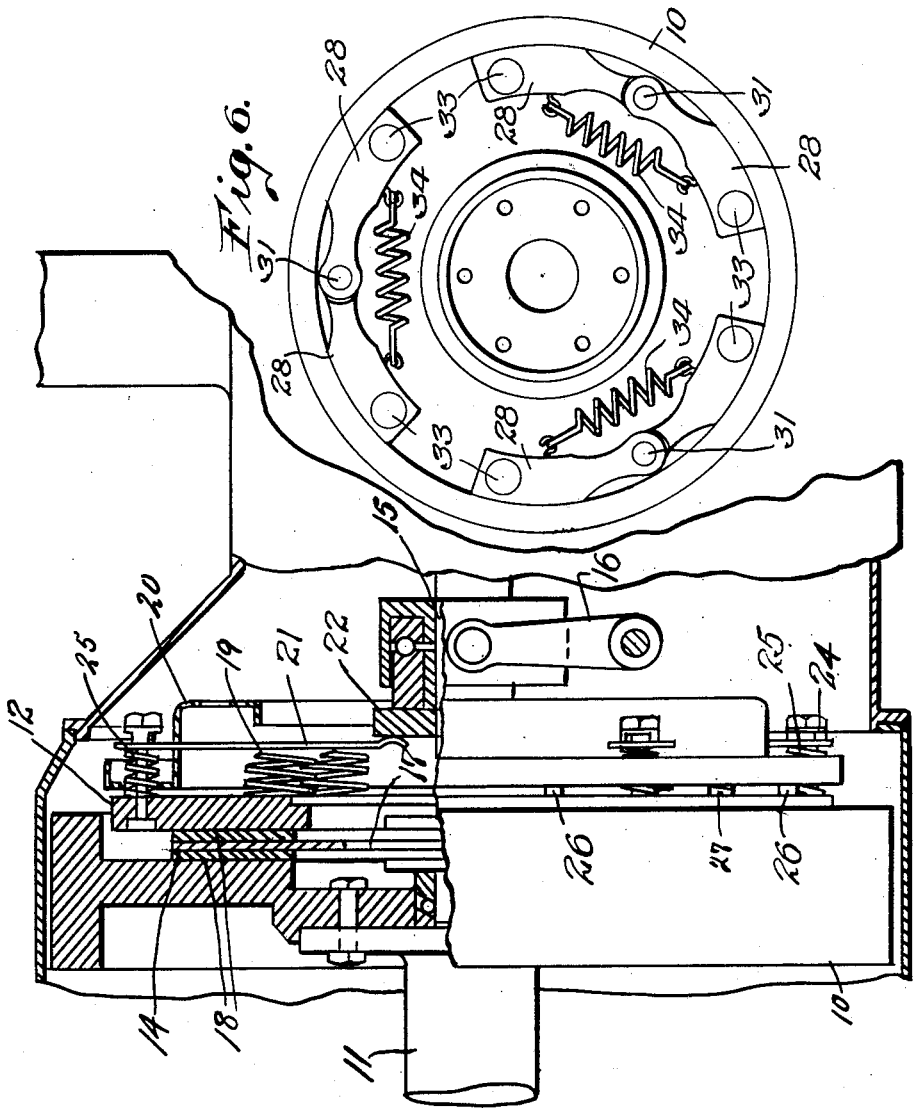
INVENTOR
Charles A. Chrstos Jr.
By W. W. Williamson
Atty.

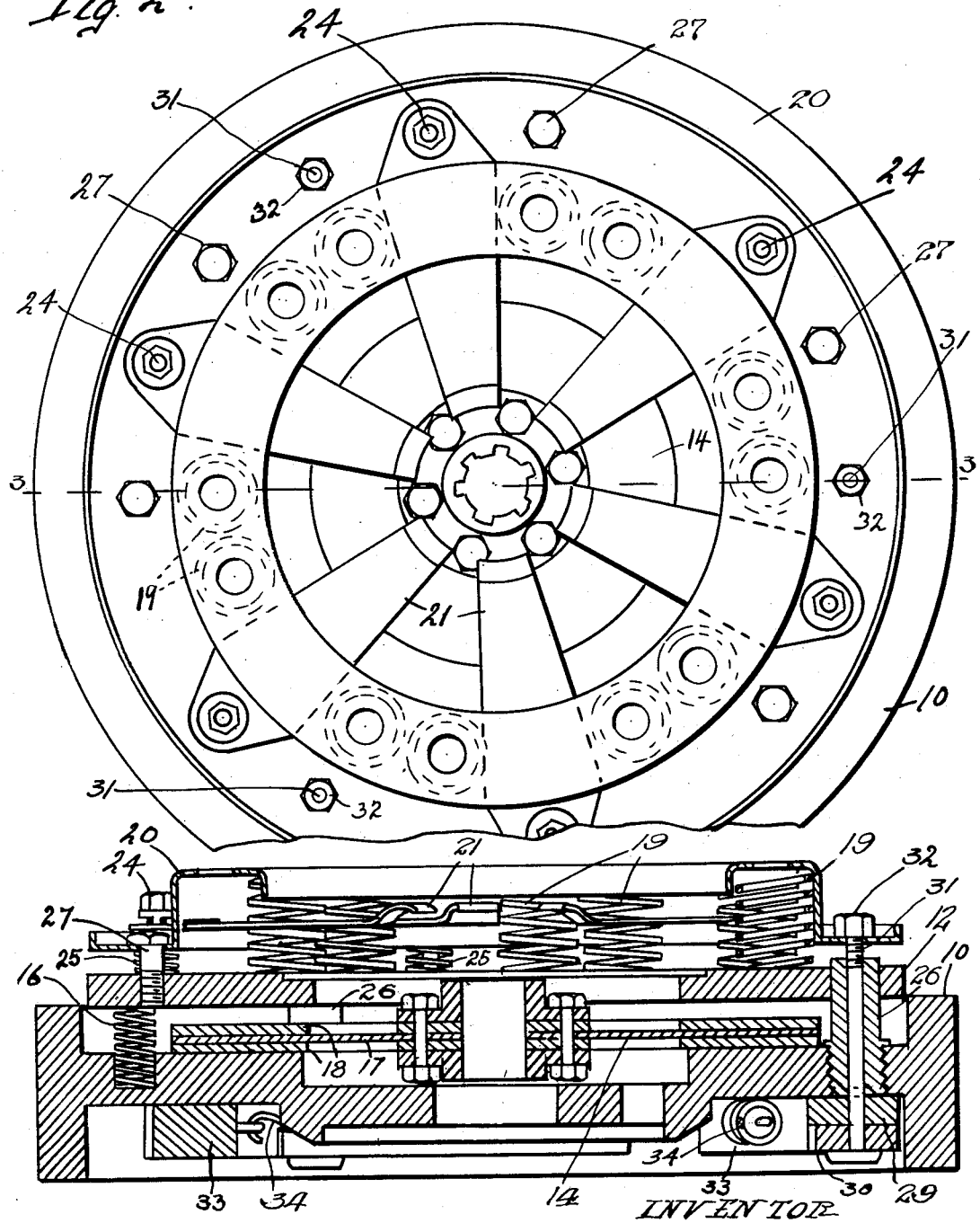

April 26, 1932.   C. A. CHRSTOS, JR   1,855,624

COMBINED MANUALLY AND AUTOMATICALLY OPERATED CLUTCH

Filed Nov. 12, 1928   4 Sheets-Sheet 3

INVENTOR
Charles A Chrstos Jr.
By W. W. Williamson
Atty.

April 26, 1932.  C. A. CHRSTOS, JR  1,855,624
COMBINED MANUALLY AND AUTOMATICALLY OPERATED CLUTCH
Filed Nov. 12, 1928  4 Sheets-Sheet 4
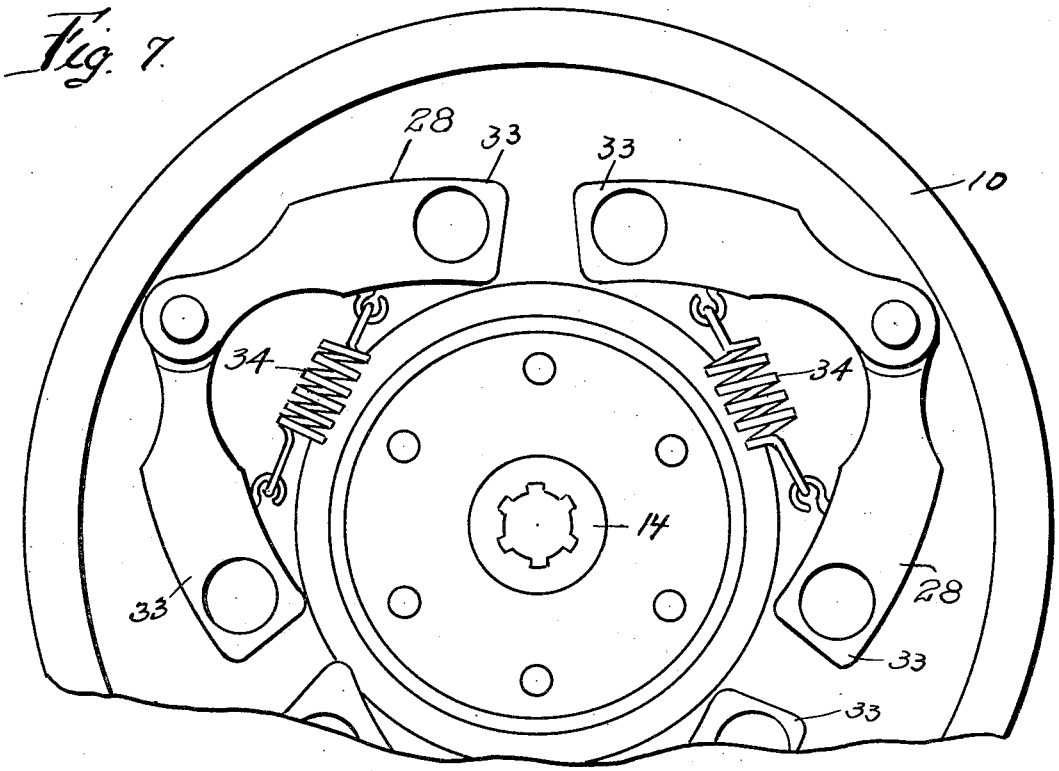
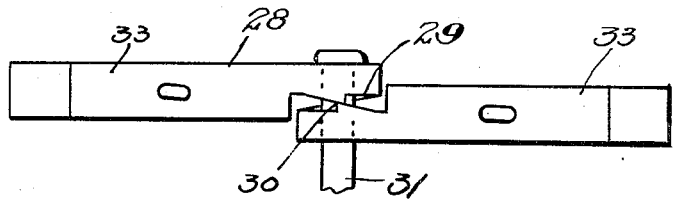
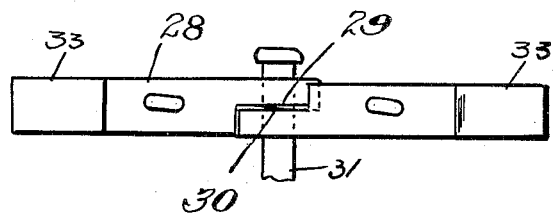
INVENTOR
Charles A. Chrstos Jr.
By W. W. Williamson
Atty.

Patented Apr. 26, 1932

1,855,624

UNITED STATES PATENT OFFICE

CHARLES A. CHRSTOS, JR., OF PHILADELPHIA, PENNSYLVANIA, ASSIGNOR TO ELSIE CHRSTOS, OF PHILADELPHIA, PENNSYLVANIA

COMBINED MANUALLY AND AUTOMATICALLY OPERATED CLUTCH

Application filed November 12, 1928. Serial No. 318,620.

My invention relates to new and useful improvements in a combined manually and automatically operated clutch, one of the principal objects of which is to provide an arrangement or combination of elements wherein the speed of the prime mover controls the clutch for transmitting motion to a driven member or device.

The invention embodied herein is particularly adapted for use in connection with automobiles wherein the speed of the engine or prime mover is controlled by the amount of carburetted air or other hydro-carbon fuel fed thereto and the speed of such engine automatically controls the clutch, thus making it unnecessary to operate the clutch manually except in few or isolated cases, as for instance, when it becomes necessary to shift the transmission gears while the automobile is running. It might be well to mention at this time that the automobile can usually be started with the gears in the high speed positions, but when ascending steep grades, it is sometimes necessary to use an intermediate or low speed, thus necessitating a change of gears which can only be accomplished by the manual operation of the clutch.

Another object of the invention is to provide a clutch in which one of the elements is automatically actuated by a governor or governors.

A further object of the invention is to produce a structure that will permit the application of the invention to old or previously manufactured clutches as well as providing for its embodiment in new clutches.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Fig. 1 is a side elevation of the transmission and clutch casings with portions broken away and shown in section to illustrate an installation of a clutch embodying my invention.

Fig. 2 is an elevation of the clutch with a portion broken off.

Fig. 3 is a section on the line 3—3 of Fig. 2, showing all the parts in inoperative positions or declutched.

Fig. 6 is a front elevation of the clutch showing the governors in the positions assumed due to centrifugal force and when the clutch is in full operative condition.

Fig. 7 is a fragmentary view similar to Fig. 6, showing the clutch at rest.

Fig. 8 is an edge view of the cams and weighted arms of governors showing said weighted arms extended.

Fig. 9 is a similar view showing the weighted arms contracted.

Figure 4:
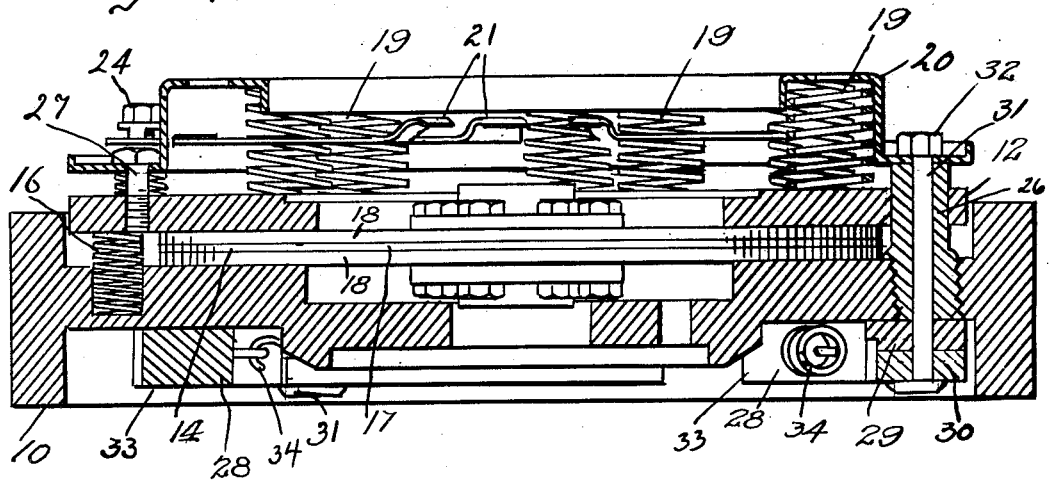
Fig. 4 is a view similar to Fig. 3 showing the clutching elements in elevation and illustrated in engagement or the parts in operative positions through the automatic actuation of the clutch.

In carrying out my invention as herein embodied, 10 represents one of the clutch elements, herein illustrated as a fly wheel, which is connected in the usual manner with the crank shaft 11 of an engine, and 12 is the other clutch element shown as a driving flange or plate.

Between the clutch elements 10 and 12 is located a friction or clutching disc 14 slidably connected in the usual manner to the transmission shaft 15 and when the driving flange is drawn tight against the clutch disc 14, the latter is clamped between the two clutch elements and therefore the crank shaft is connected to the transmission shaft 15, but said driving flange or plate is normally forced outward or away from the clutch element or fly wheel 10 by suitable springs 16. The friction or clutch disc 14 may be of any usual or desirable construction and as herein illustrated consists of the metal core or web 17 faced on both sides with suitable friction material 18.

The clutch element 12 or driving flange has a plurality of clutch springs 19 mounted thereon and engaging an annulus 20 which is held in place by the studs 27 passing through the annulus and threaded into the clutch element or driving flange 12, but it is to be understood that the upper portions of the stud bodies are plain or smooth so that the annulus can slide thereon as occasion requires.

By adjusting the studs 27 the movement of the clutch element 12 necessary to bring it into contact with the friction clutch disc 14 may be varied and the tension of the clutch springs 19 changed.

On the fly wheel or clutch element 10 are mounted a number of governors 28, Figs. 6 to 9 inclusive, each of which comprises a pair of coacting cams 29 and 30. These cams are journalled upon bolts 31 passing through the clutch elements 10 and 12 and the annulus 20 and said bolts preferably project through hollow studs or bushings 26 carried by the clutch element 10 and of sufficient length to extend through apertures in the clutch element 12 for coaction with the annulus 20 to limit its inward movement. Nuts 32 are threaded on the bolts for holding the annulus, cams and component parts in place and to provide means for varying the adjustment of the annulus and consequently the clutch element 12 relative to the clutch or friction disc 14 and the cams 29 and 30.

Each cam is provided with a weighted arm 33 which tends to throw outward due to centrifugal force when the clutch is revolving and co-operate in a manner to separate them when this occurs, as shown in Fig. 8. Since one of these is resting against a face of the clutch element or fly wheel 10, the other of said cams must be moved outward and since said other cam is in engagement with the head of the bolt 31, the latter will be drawn inward, thus moving the clutch element 12, through the medium of the annulus 20 and the clutch springs 19, toward the clutch element 10 until the clutch disc 14 is clamped between the two clutch elements and motion will be transmitted from the driving clutch element to the driven clutch element.

In order to control the cams and weights of the governors and prevent too rapid operation of the parts, springs 34 of any desirable construction or configuration may be utilized to normally maintain the weights or weighted arms in contracted positions, as shown in Fig. 7. While I have shown, for convenience of illustration only, coil springs attached to cooperating pairs of weighted arms, it will be obvious that other forms of springs may be used and each arm might be provided with a separate or independent spring.

The annulus 20 has a number of clutch levers 21 fulcrumed therein, the inner ends of which are actuated by a thrust collar 22 which in turn is actuated through the medium of the fork 23 by means of the usual clutch pedal while the outer ends of said clutch levers 21 are attached by bolts 24 to the clutch element 12 and said clutch levers are normally held at the outer ends of the bolts 24 by springs 25.

From the foregoing description, it will be obvious that the general operation of the device is as follows:—

Assuming that the transmission gears are in the high speed positions and the engine or prime mover has been started so as to transmit motion to the fly wheel, and again assuming that the engine is running at a relatively low speed so that the governors will remain in a contracted or partially contracted position, substantially as shown in Fig. 7, the clutch parts will be disengaged as shown in Fig. 3 and no motion or power will be transmitted from the engine to the driven device.

By speeding up the engine, due to feeding it a greater amount of fuel, and under some conditions advancing the spark, the number of revolutions per minute of the clutch element or fly wheel 10 will be increased and the governors will be gradually thrown out or extended until they assume the position shown in Fig. 6, at which time the cams 29 and 30 will have acted to clamp the friction clutch disc between the two clutch elements 10 and 12, so that motion will be transmitted from the driving member, with which the clutch element 10 is connected, to the driven device, with which the clutch or friction disc is connected.

During the time the governors move from the position shown in Fig. 7 to that in Fig. 6 respectively, said governors will fluctuate a number of times. First, the weighted arms will move outwardly a considerable distance so as to clamp the clutch disc between the clutch elements and although a certain amount of motion will be transmitted through the clutch, as soon as the clutch disc is clamped, the engine will be slowed down, due to the power required for transmitting motion to the driven device and therefore the weighted arms of the governors will be slightly contracted due to the change of speed of revolution of the clutch and due to the tension of the springs 34.

This will slightly release the clutch disc permitting the engine to again increase its speed so that the governors will once again be extended to firmly clamp the clutch disc between the clutch elements. These actions will continue intermittently until the driven device has gradually obtained the same speed as the engine.

When the parts of the clutch are completely engaged the annulus 20 will rest against the outer ends of the bushings 26 and the clutch springs 19 will resiliently hold the clutch element or driving flange 12 in contact with the clutch disc 14, thus providing the necessary flexible connection.

Figure 5:
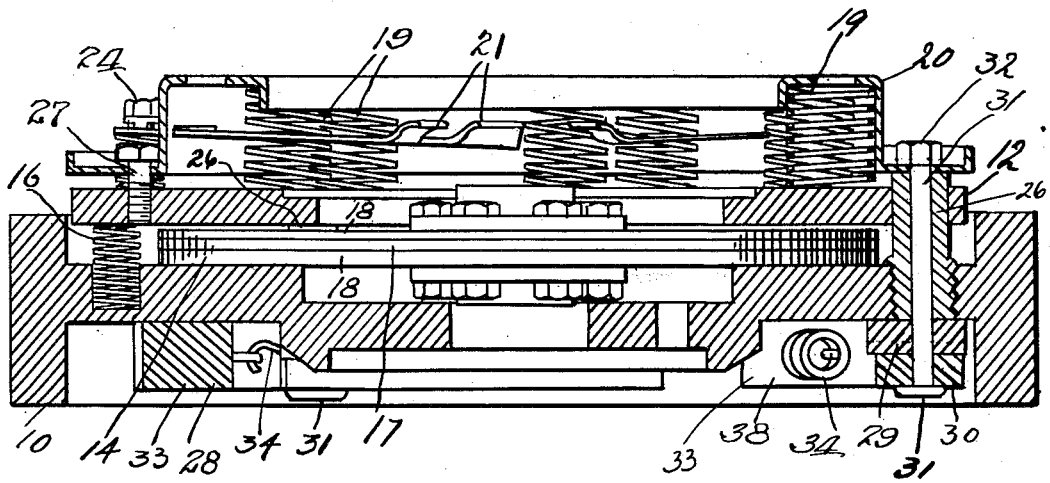
Fig. 5 is a view similar to Fig. 4, illustrating the positions assumed upon declutching manually.

If for any reason it is necessary to declutch or disengage the clutch elements while the parts are in motion, as when it becomes necessary to change the transmission gears, this may be accomplished in the usual manner by actuating the clutch pedal which will force the inner ends of the clutch levers inward, moving the bolts 24 outward, which will withdraw the clutch element 12 from the clutch friction disc 14, as shown in Fig. 5, so as to release the clutch and as soon as the clutch pedal is released, the clutch springs 19 will return the parts to the positions shown in Fig. 4. This is possible because the annulus 20 is securely held between the outer ends of the bushings 26 and the nuts 32 on the bolts 31.

When it is desirable to provide a positive connection between the driven device, unit or member and the driving member or prime mover, the clutch pedal, which generally does not have to function, is properly operated to move the levers 21 inward, which will cause the annulus 20 to travel toward the clutch element or fly wheel 10, carrying the clutch element or driving flange 12 with it, through the medium of the clutch springs 19, thus clamping the disc 14 between the clutch elements.

This manual operation of the clutch for engaging the parts can take place until such time as the annulus 20 contacts with the bushings 26. Thereafter the operation would be the same as described in connection with Fig. 5, and would declutch the parts.

In view of this condition the actuation of the clutch pedal must be stopped when the annulus contacts with the bushings 26. A proficient operator can "feel" when the annulus engages the bushings and discontinue movement of the clutch pedal. However the pedal will have to be held in the clutching position so long as the positive connection is to be manually maintained; therefore it would be advisable to provide some fastening or holding means for connection with the pedal to hold it in a certain position. A chain or other flexible element may be anchored at some point so as to be slipped over the pedal or a well-known latch or catch can be utilized.

Some of the advantages derived from such a construction when installed in an automobile are, the safety ensuing from having the engine connected with the running gears in addition to the use of brakes when parking on hills or other inclined driveways, and the possibility of starting the engine by running the automobile, either by towing or pushing the same.

Of course I do not wish to be limited to the exact details of construction as herein shown, as these may be varied within the limits of the appended claims without departing from the spirit of my invention.

Having thus fully described my invention, what I claim as new and useful is:—

1. A clutch of the kind disclosed comprising coacting clutch elements, one of which is carried by a driving device, a disc carried by a driven device and located between said clutch elements to be clamped thereby for connecting the driving and driven devices, an annulus located in co-operative relation to one of the clutch elements, clutch springs between the annulus and the contiguous clutch element, governor means actuated by centrifugal force to move the annulus and its associated clutch element inward toward the other clutch element to clamp the disc between them, means to limit the inward movement of the annulus, and means to normally force the clutch element contiguous to the annulus outward.

2. The structure set forth in claim 1, in combination with means fulcrumed on the annulus and manually operative to move the annulus with its associated clutch element inward when the governor means is in a rest or intermediate position and to move the said clutch element associated with the annulus outward for declutching when the annulus is in its innermost position.

3. The combination with a clutch including a pair of clutch elements, means to normally force them apart, a friction clutch disc located between said clutch elements, an annulus situated contiguous to one of said clutch elements, clutch springs between said annulus and the contiguous clutch element, and means anchored at one end to the clutch element contiguous to the annulus and fulcrumed on said annulus for manual operation of the clutch, of bushings carried by the other clutch element and projecting through the one contiguous to the annulus and acting as stops to limit the inward movement of the annulus, governors having portions passing through the bushings and connected with the annulus and actuated by centrifugal force to move the annulus inward toward the bushings and through the medium of said annulus and the clutch springs to move the clutch element contiguous to the annulus for clamping the disc between the clutch elements, and stud bolts passing through the annulus and having threaded connection only with the clutch element contiguous to said annulus.

4. The structure set forth in claim 3 wherein the governors each comprise a post slidably mounted in a bushing and passing completely through the clutch element carrying the bushing and connected to the annulus, a pair of coacting cams journalled on the post with one engaging the face of the clutch member and the other engaging a head on the post, arms carried by the cams whereby centrifugal force causes said arms to move away from each other for actuating the cams to slide the post longitudinally for moving the annulus inward, and means normally forcing the arms toward each other.

In testimony whereof, I have hereunto affixed my signature.

CHARLES A. CHRSTOS, JR.